United States Patent [19]
Burgess, Jr.

[11] 3,921,853
[45] Nov. 25, 1975

[54] MOVING GATE DISCHARGE SYSTEM

[76] Inventor: Ralph D. Burgess, Jr., 2800 Pheasant Road, Excelsior, Minn. 55331

[22] Filed: Dec. 16, 1974

[21] Appl. No.: 532,913

Related U.S. Application Data

[63] Continuation-in-part of Ser. No. 439,342, Feb. 4, 1974, Pat. No. 3,877,585.

[52] U.S. Cl. .............. 222/1; 214/17 DB; 222/280; 222/404; 222/405; 222/415
[51] Int. Cl.² .............................................. G01F 11/00
[58] Field of Search .......... 222/405, 404, 406, 415, 222/280, 1; 214/17 DB, 17 DA

[56] References Cited
UNITED STATES PATENTS
| | | | |
|---|---|---|---|
| 1,248,303 | 11/1917 | Fromme | 222/405 X |
| 1,651,633 | 12/1927 | Ross | 222/415 X |

*Primary Examiner*—Stanley H. Tollberg
*Assistant Examiner*—Hadd Lane
*Attorney, Agent, or Firm*—Schroeder, Siegfried, Ryan & Vidas

[57] ABSTRACT

A moving gate discharge system designed to prevent product breakage while discharging either free-flowing or non-free-flowing products in a uniform flow from a receptacle having a moving bottom is disclosed. The system includes an endless circulating feeder mounted across the discharge of the receptacle with its lower end portion moving upwardly and downwardly as a result of an eccentric mounting. Tine assemblies are mounted on the feeder and are spaced apart somewhat farther than the distance the feeder moves during one period of movement of the lower end portion thereof so that each successive tine assembly engages the product behind the crest of the waves created in the product by the preceding tine assembly. The tines are constructed and arranged to lift the product as it progresses same toward the discharge and so as to pivot rearwardly and elevate to withdraw the tines from the product with a movement having a substantial longitudinal component as they move past the discharge. In addition, the lower rung of the feeder is guided along a convex path which follows a general plane that forms an angle with horizontal less than the angle of slope for non-free-flowing products and less than the angle of repose for all products.

22 Claims, 7 Drawing Figures

3,921,853

MOVING GATE DISCHARGE SYSTEM

This application is a continuation-in-part of my co-pending application, Ser. No. 439,342, filed by me on Feb. 4, 1974, now U.S. Pat. No. 3,877,585 of Apr. 15, 1975, and entitled MATERIAL DISTRIBUTING SYSTEM FOR NONFREE-FLOWING PRODUCTS. The system disclosed and claimed herein is shown in a somewhat more general manner in said co-pending application.

It is a general object of my invention to provide a novel and improved moving gate discharge system for discharging free-flowing and non-free-flowing products from a receptacle having a moving bottom in such a way as to avoid breakage of the product more effectively.

A more specific object is to provide a mechanism for avoiding substantial product breakage while feeding such products from such a receptacle in a uniform flow by lifting the product while moving it linearly of the plane of its angle of slide toward and to the discharge of its container.

Another object is to provide a novel moving gate discharge system constructed and arranged to engage and lift the product with the product engaging assemblies in such a way as to facilitate the lifting action upon the product and thereby minimize breakage of the product, particularly if the product is of a non-free-flowing character.

Another object is to provide an improved moving gate discharge system constructed and arranged in such a way as to withdraw the product engaging assemblies at the end of their product moving path adjacent the discharge with a motion having a strong component linearly of the product engaging elements, thereby avoiding breakage which would otherwise normally occur.

Another object is to provide a novel moving gate discharge system for discharging both free-flowing and non-free-flowing products in which the product engaging elements are constructed and arranged to facilitate lifting action upon the product as it is progressed and as the elements move through the product, to thereby minimize breakage to the product while ensuring a uniform flow at the discharge.

These and other objects and advantages of my invention will more fully appear from the following description, made in connection with the accompanying drawings, wherein like reference characters refer to the same or similar parts throughout the several views, and in which:

FIG. 4 is a diagrammatic side elevational view of a single tine and its mounting, illustrating the movement of the tine and its mounting as it moves around the lower end of the conveyor as shown in FIG. 3.

FIG. 5 is a detailed fragmentary elevational view of one of the lower sprockets and its supporting pivot arm.

FIG. 6 is a fragmentary plan view of the upper end of the discharge system and its mounting upon the receptacle.

Figure 1:
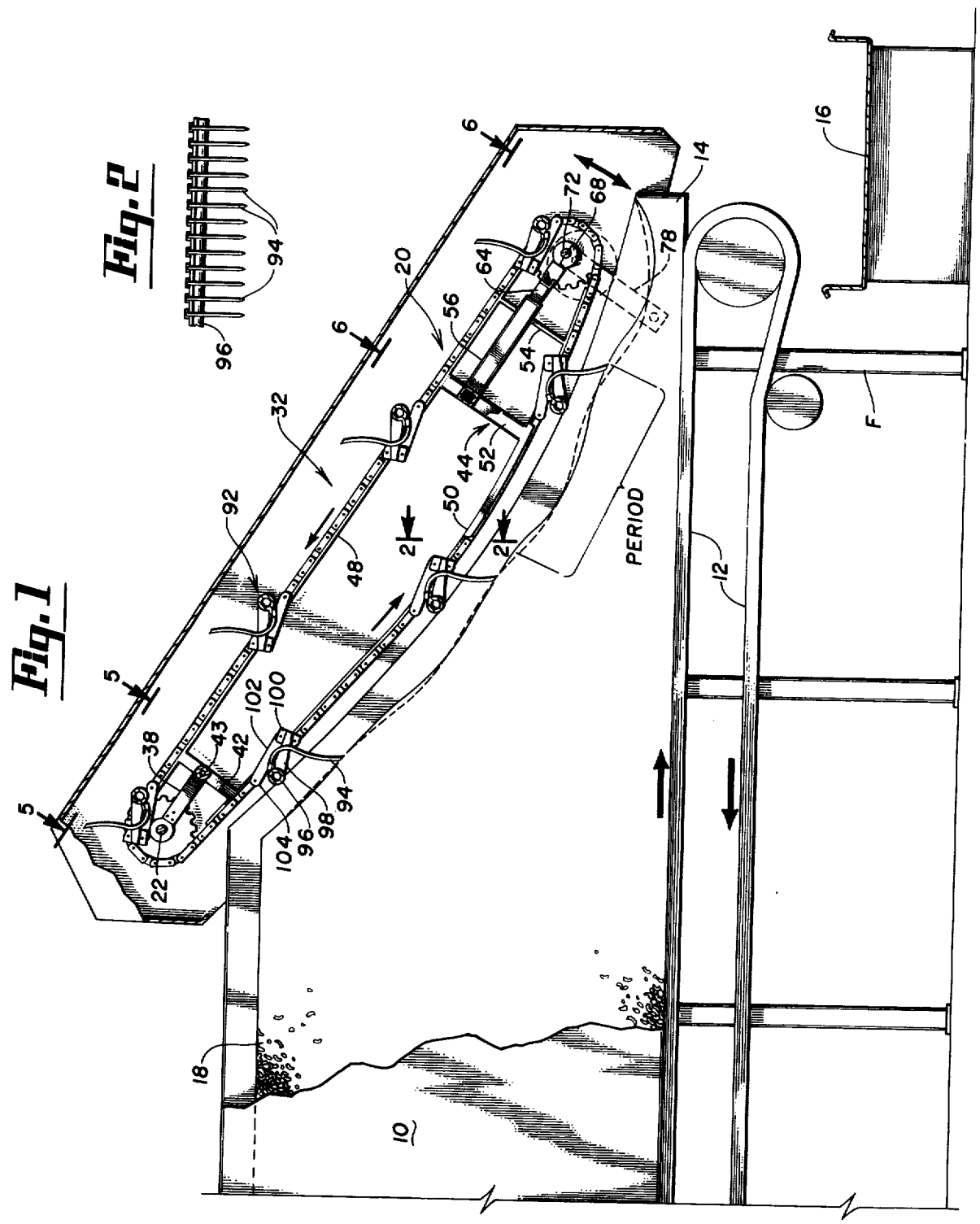
FIG. 1 is a partial side elevational view of a product receptacle having a moving bottom and a moving gate discharge system mounted across the discharge thereof.
Figure 2:
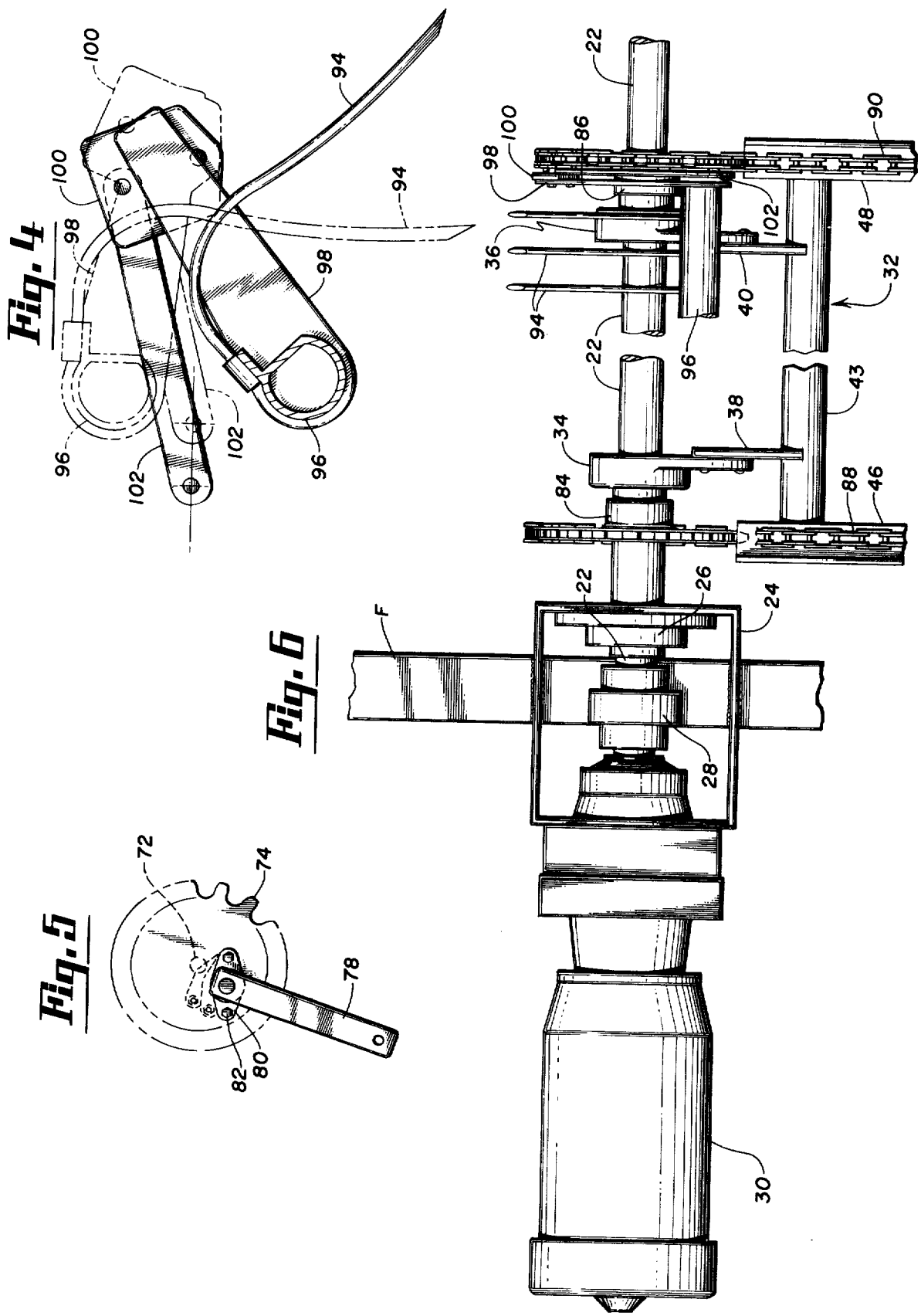
FIG. 2 is a fragmentary vertical sectional view taken through the lower rung of the conveyor of the discharge system along line 2—2 of FIG. 1.

The preferred embodiment of my invention is shown in FIGS. 1–7, inclusive, and includes a frame F which supports a receptacle or bin 10 having a moving bottom 12 in the form of a continuous conveyor. The ultimate or terminal discharge 14 of the receptacle 10 is disposed immediately above a vibratory discharge conveyor 16 which receives the particulate product 18 therefrom. As shown, the endless circulating feeder 20 and the receptacle 10 with the moving bottom 12 comprise the entire gate discharge system.

The feeder 20 is mounted for swinging movement about a shaft 22 which is in turn supported at its inner end by the frame F and at its outer end by support means, not shown. The shaft 22 extends through a mounting bracket 24 and is supported thereon by a bearing 26, the bracket being supported by the frame F. A coupling 28 couples the shaft 22 to a driving motor 30, as shown.

Pivotally mounted upon the shaft 22 by means of bearings 34 and 36 and support arms 38 and 40 is a feeder frame indicated generally by numeral 32. This can best be seen by reference to FIG. 6. A transverse bar 43 is supported by arms 38, 40 and extends between a pair of vertically extending plates such as 45 which in turn support a box-like construction, as best seen in FIG. 1, indicated generally as 44. The construction 44 includes a pair of upwardly facing channels 46, 48 (see FIG. 6) and a pair of downwardly facing convexly shaped channels, such as indicated by the numeral 50 in FIG. 1. The latter function as guides for the lower rung of the chains of the conveyor, as will be hereinafter described.

Figure 7:
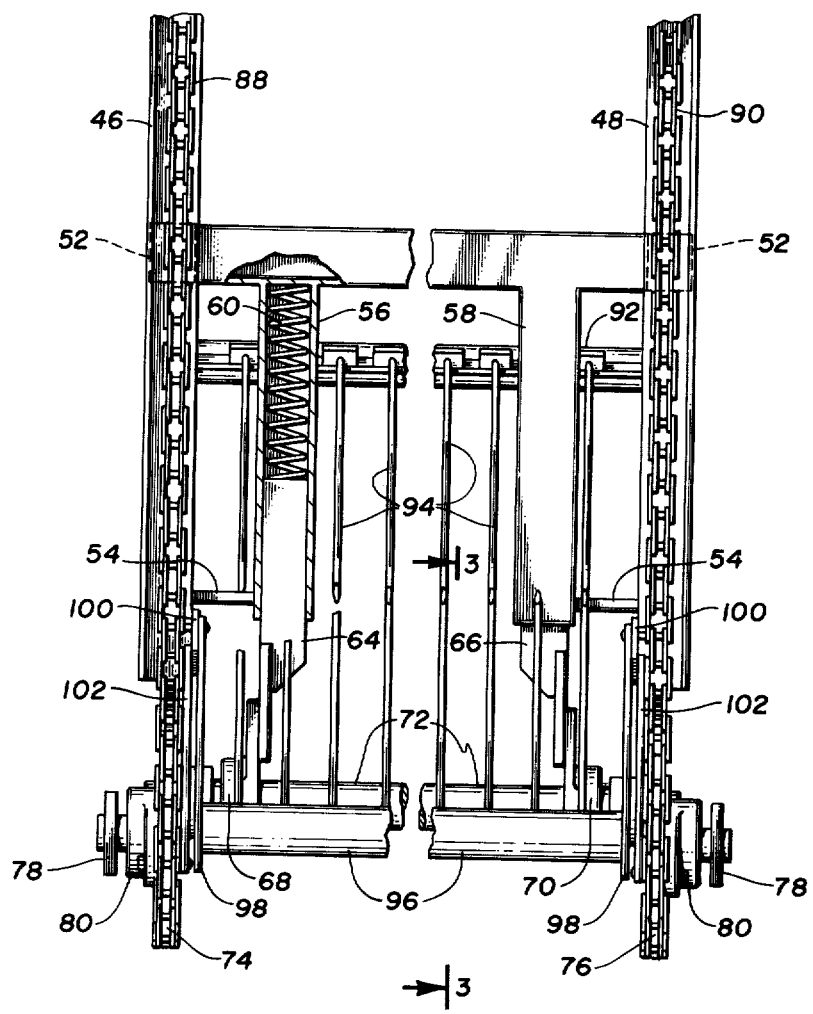
FIG. 7 is a fragmentary plan view of the lower end of the discharge system.

Adjacent the lower end of the construction 44 a pair of vertical plates 52, 54 extend between the upper and lower channels hereinbefore described and support a pair of tubular members 56 and 58 which extend forwardly and enclose a spring therewithin, indicated by the numeral 60, in FIG. 7. Rods 64 and 66 are slidably received within the tubular members 56 and 58 and carry bearings 68 and 70, respectively, at their forward ends. A transverse shaft 72 is carried by the bearings 68, 70 and in turn carries sprocket wheels 74 and 76 at its outer ends. Each of these sprocket wheels, as best shown in FIG. 5, is eccentrically and pivotally mounted upon the upper end of a pivot arm, identified by the numeral 78, by means of an adjustable securing plate 80 which is secured in one of three positions by a bolt 82 to the sprocket wheel at a point removed from its pivot. It will be seen by reference to FIG. 5 that the degree of eccentricity can be readily altered by moving the bolt 72 to a different position, two of which are shown in broken lines. In my preferred embodiment, the degree of eccentricity may be varied between ¾ inch to 1½ inches.

As best shown in FIG. 6, the shaft 22 carries and drives a pair of drive sprocket wheels 84 and 86 and also a chain 88 and 90, respectively, which carry a plurality of tine assemblies 92. Each tine assembly 92 is comprised of a plurality of tines 94 mounted upon a transverse support 96 which in turn is supported at each of its ends by a mounting arm 98, as best shown in FIG. 1 and FIG. 4. The forward end of each mounting arm 98 is fixedly secured to a mounting plate 100 which is pivotally mounted upon a link of its associated chain and has its upper end pivotally connected by a link 102 to a trailing link of the chain as at 104. As will be readily appreciated by reference to FIGS. 3 and 4, the link 102 is also pivotally connected to the chain at its rear end.

Figure 3:
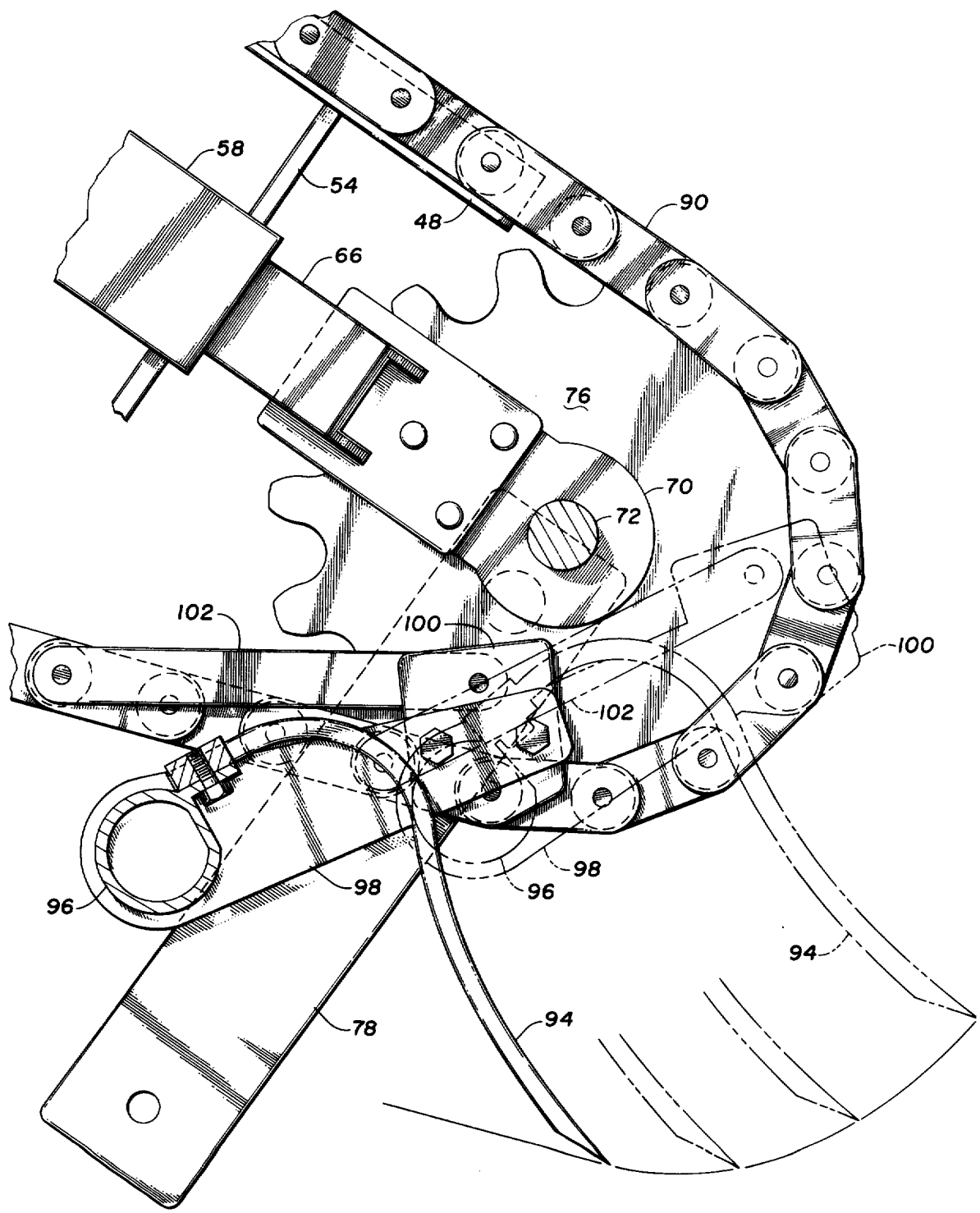
FIG. 3 is a fragmentary side elevational view of the lower end of the discharge system drawn on an enlarged scale and illustrating the movement of the tines as they pass around the lower end of the conveyor.

The tines 94, as best shown in FIGS. 3 and 4, extend forwardly from the transverse support 96 and are concavely shaped so that as they engage the product, it slides upwardly and rearwardly therealong to thereby provide a lifting component, as a result of the shape of the tines. It will be noted that the tines extend forwardly in the direction of movement of the feeder towards the discharge 14.

The motor 30 is connected electrically with the power driven conveyor 12 so that both operate simultaneously, each being controlled by control means (not shown) governed by the rate of feed of the conveyor 16. The motor 30 drives shaft 22, which in turn drives sprocket wheels 84 and 86 to drive chains 88, 90 and move the tine assemblies 92 of the lower run of the feeder downwardly and toward the discharge 14. It will be noted that the feeder 20 extends upwardly and rearwardly from this discharge. As the chains are driven, they drive sprocket wheels 74, 76 which, as they rotate about their eccentric mounting on pivot arms 78, cause the lower end portion of the feeder 20 to oscillate upwardly and downwardly as indicated by arrows in FIG. 1. The spring loading of the sprocket wheels 74, 76 maintains the chains in taut condition and permits the eccentric movement of the sprocket wheels as they rotate.

As shown, the lower rungs of chains 88-90 are guided within the convex guide channels 50. Thus, the tine assemblies would be guided along a path identical to that described by guide channel 50 were it not for oscillation of the lower end of the feeder 20 and the spacing of the assemblies which will be hereinafter described.

The spacing of the tine assemblies are somewhat in excess of the circumference of the sprocket wheels 74, 76 and the paths shown in FIG. 1 in broken lines is a consequence thereof, each succeeding path described being of the same amplitude and period and following the same general plane of its predecessor but trailing it by a small distance.

The rising and falling of the lower end portion of the feeder 20, together with the convex shape of the channel guide 50 and the spacing of the tines as described, causes the latter to describe undulating paths of movement as shown in FIG. 1, the solid line tracing the movement of the tines of one tine assembly and the broken lines tracing the path of the lower end of the tines of the following tine assembly. It will be noted that the amplitude and period of the dotted line path is the same as that of the path of the preceding assembly tines but that the path trails the earlier path somewhat.

In the embodiment shown, I have utilized sprocket wheels 74, 76 and 84, 86 with a circumference of 30 inches. The spacing between the tine assemblies of 34 inches, 4 inches greater than the circumference of the sprocket wheels. The chains 88, 90 have a 2 inch pitch and are of the type obtained from the Morse Division of the Borg-Warner Company and are identified by that company as C-2082 Roller Chain. Thus, the spacing of the teeth assemblies, as shown, is about 1.10 times the circumference of the eccentrically mounted sprocket wheels 74, 76. Although the spacing may vary, it should exceed the circumference of these sprocket wheels somewhat so that each succeeding tine assembly will engage the product behind the crest of the waves of the path of the preceding tines. It is preferable, particularly for non-free-flowing products that the spacing be less than 1.5 times the circumference of these sprockets. It will be appreciated, of course, that the spacing of the tine assemblies may be any integer of the spacing set forth above, resulting in the same paths being described, but with different frequency unless the speed of the chains is adjusted.

It will be noted that the convex guide 50 provides an added lifting action to the tines 94 as the tines move from the longitudinal midpoint of the feeder 20 to its lower end. Thus, an increased lifting function is thereby provided to minimize breakage of the product.

Products such as frozen french fries, potato chips, corn flakes or the like, noodles, etc. are examples of non-free-flowing products which are fragile and if handled mechanically, must be handled in a very careful manner so as to minimize breakage. Such products will tend to build up rather than to flow freely and then will cascade or avalanche, with resulting nonuniform flow and undue breakage. Such products have a nondefineable angle of repose and my moving gate discharge system is particularly effective for such products. For such products, I prefer to orient the feeder 30 so that the longitudinal axis thereof extends at an angle to horizontal which is less than the angle of slide which, by definition, is less than the angle of repose of any product. For free-flowing products, the angle of the feeder made with horizontal may be steeper than for non-free-flowing products but even for the latter, I prefer to orient the general plane of the feeder to an angle with horizontal which is less than the angle of repose.

The amount of eccentricity may be varied in accordance with the nature of the product by shifting plate 80 to another position, as shown in FIG. 4. The more free-flowing the product is, the less eccentricity is required.

The mounting of the tine assemblies is noteworthy for several reasons. The tines 94 extend forwardly and are concavely shaped and are impregnated with tetrafluoroethylene (Teflon). The product slides upwardly along these tines very easily and as a consequence, are lifted and moved forwardly with minimum breakage. It will be noted that the tines of the trailing assembly, as best shown in FIG. 1, engage the upper surface of the product a short distance behind the crest of the underlying path of the preceding tines and continue to engage the product along the down-slope and move it toward the valley of the preceding path. Thus, a minimum of obstruction is encountered by the product as it is being moved toward the discharge 14 and the crest of the waves viewed on the surface of the product appears to progress upwardly toward the top level of the mass of the product as the feeder 20 operates.

The movement of the tines 94 as they pass around the lower end of the feeder 20 is noteworthy because of the fact that the normal effect of such tines moving around an axis of such a conveyor would tend to throw the product and damage it since the tines, if mounted conventionally, would move more rapidly than otherwise. FIG. 4 illustrates, however, that as each tine assembly moves around the axis of the lower sprocket wheels 74, 76 the link 102 causes the pivot plate 100 to pivot and thereby swing the mounting arm 98 and the tine assembly upwardly while at the same time causing the tines 94 to pivot rearwardly. This causes the tine 94 to be withdrawn somewhat longitudinally from the product in a gentle manner so as to avoid substantial breakage which would normally occur if the tines were permitted to follow their path were they fixedly mounted upon the chain. As a result of this mounting, a very uniform and nondamaging flow is provided to the product as it is discharged upon the conveyor 16.

The motor 30 is provided with a variable speed drive so that the speed of the feeder 20 may be adjusted. I prefer to operate the feeder 20 at a speed of approximately 45 feet per minute and I have found that when operating at this speed, substantial breakage is avoided during normal packaging operations which are fed by the conveyor 16. The optimum feeder speed, of course, varies with the product and the speed of the discharge conveyor belt 12 which carries the product to the discharge gate 14.

From the above, it can be seen that I have provided a novel and improved feeder system which will substantially diminish breakage of both free-flowing and non-free-flowing products while discharging the same from such a receptacle in a uniform flow. With such a feeder system, the product can be moved forwardly and discharged without any build up and resulting avalanche or cascading, consequent breakage and nonuniform feeding. Since uniform feeding is important in packaging operations, for example, and since product breakage is a serious problem in the food industry, particularly, my feeder system has been found to have substantial merit and solve problems which have heretofore remained unsolved.

It will, of course, be understood that various changes may be made in the form, details, arrangement and proportions of the parts without departing from the scope of my invention which consists of the matter shown and described herein and set forth in the appended claims.

What I claim is:

1. A moving gate discharge system for preventing product breakage in discharging particulate products in a uniform flow from a receptacle having a moving bottom comprising:
   a. a receptacle having a discharge and moving bottom which moves the product in said receptacle to said discharge;
   b. an inclined elongated endless circulating feeder mounted across said discharge of said receptacle and extending upwardly and rearwardly therefrom;
   c. said feeder being mounted for movement about spaced upper and lower transverse axes and having its longitudinal axis extending at an angle relative to horizontal which is less than the angle of slide of the particulate product to be discharged from said receptacle;
   d. said feeder having a lower end portion immediately adjacent said discharge of said receptacle;
   e. a plurality of tine assemblies carried by said feeder at points spaced longitudinally thereof and traveling therewith toward said discharge while in position to engage the product;
   f. drive means operatively connected to said feeder for moving said feeder; and,
   g. mounting means connected to the lower end portion of said feeder and causing the same to rise and fall regularly as said feeder moves;
   h. said tine assemblies being spaced apart along the length of said feeder a distance somewhat in excess of the longitudinal distance said feeder travels as its lower end portion moves through one period of its said rising and falling motion.

2. The structure defined in claim 1, wherein said tine assemblies are spaced apart a distance approximating 1.10 times the distance said feeder travels as its lower end portion moves through one period of its said rising and falling motion.

3. The structure defined in claim 1 including mechanical means mounting said tines upon said feeder and constructed and arranged to cause said tines to pivot rearwardly as they move past said discharge of said receptacle and about said lower axis of said feeder.

4. The structure defined in claim 1 including mechanical means mounting said tines upon said feeder and constructed and arranged to cause said tines to pivot upwardly and rearwardly as they move past said discharge of said receptacle and about said lower axis of said feeder.

5. The structure defined in claim 1 wherein said tines are curved concavely and extend forwardly in the direction of motion of said feeder.

6. The structure defined in claim 1 and a convexly shaped track supported by said receptacle and guiding the lower rung of said feeder as it moves.

7. The structure defined in claim 1 wherein said tines are curved concavely and extend forwardly in the direction of movement of said feeder and are impregnated with polytetraflouroethylene.

8. The structure defined in claim 3 wherein said feeder includes a linked chain at each of its sides, and said mechanical means includes:
   i. a transverse support supporting a plurality of said tines;
   j. a pair of mounting arms one each of which is connected to and carries said support at one of its ends;
   k. a pair of pivot plates one each of which is pivotally connected to opposite links of said chains at opposite sides of the feeder and fixedly connected to the other end of one of said arms; and,
   l. a pair of links one each of which is pivotally connected adjacent one of its ends to one of said pivot plates at a point disposed inwardly of its point of pivotal connection to said chain and adjacent its other end to another and trailing link of said chain whereby said tines are caused to be lifted and pivoted rearwardly as they move past said discharge and about said lower axis of said feeder.

9. The structure defined in claim 1 wherein said feeder includes a pair of transversely spaced sprocket wheels defining the lower axis thereof, and said mounting means includes a pair of pivotally mounted pivot arms one each of which is pivotally and eccentrically connected to one of said sprockets in supporting relation whereby the lower end of said feeder is caused to rise and fall as said sprockets are caused to rotate.

10. The structure defined in claim 9 wherein each of said sprocket wheels is movably mounted on said feeder and resiliently urged away from the upper axis thereof.

11. The structure defined in claim 9 wherein said feeder has an upper and lower rung, and
   i. said tine assemblies being constructed and arranged in an out-of-phase relationship with respect to the pitch diameter of said sprocket wheels; and
   j. a convexly shaped track supported by said receptacle and guiding the lower rung of said feeder as it moves.

12. The structure defined in claim 11, wherein the tines of said tine assemblies are curved concavely and extend forwardly in the direction of the motion of said feeder.

13. The structure defined in claim 8 wherein said feeder includes a pair of sprocket wheels defining the lower axis thereof and said mounting means includes a pair of pivotally supported pivot arms upon one of which each of said sprocket wheel is eccentrically and pivotally mounted.

14. The structure defined in claim 1 wherein the spacing between said tines is greater than the distance traveled by said feeder during its said rising and falling motion but is less than 1.5 times said distance.

15. A moving gate discharge system for preventing product breakage in discharging particulate products in a uniform flow from a receptacle having a moving bottom comprising:
 a. a receptacle having a moving bottom and an ultimate discharge;
 b. an inclined elongated feeder mounted across said discharge of said receptacle;
 c. said feeder being mounted for movement between an upper and a lower terminal;
 d. said feeder having a lower end portion immediately adjacent said ultimate discharge of said receptacle and having its longitudinal axis extending at an angle relative to horizontal which is less than the angle of repose of the particulate product to be discharged from said receptacle;
 e. said lower end portion of said feeder being mounted to permit rising and falling action thereof;
 f. means for causing said lower end portion of said feeder to rise and fall regularly as said feeder moves;
 g. product-progressing tines carried by said feeder at points spaced longitudinally of said feeder and traveling therewith, said tines being constructed and arranged in an out-of-phase relationship with respect to the longitudinal distance said feeder travels as its lower end portion moves through one period of its said rising and falling motion and being spaced a distance somewhat greater than said distance said feeder travels during said motion; and,
 h. power means operatively connected to said feeder for causing the same to move longitudinally.

16. A moving gate discharge system for preventing product breakage in discharging particulate products in a uniform flow from a receptacle having a moving bottom comprising:
 a. a receptacle having a discharge and a moving bottom which moves the product in said receptacle to said discharge;
 b. an inclined elongated continuous feeder mounted across said discharge of said receptacle and extending upwardly and rearwardly therefrom;
 c. said feeder being mounted for movement between spaced upper and lower transverse axes and having its longitudinal axis extending at an angle relative to horizonal which is less than the angle of slide of the particulate product to be discharged from said receptacle;
 d. said feeder having a lower end portion immediately adjacent said discharge of said receptacle;
 e. a plurality of tine assemblies carried by said feeder at points spaced longitudinally thereof and traveling therewith toward said discharge while in position to engage the product;
 f. drive means operatively connected to said feeder for moving the same;
 g. mechanical mounting means connected to the lower end portion of said feeder and causing the same to rise and fall regularly as said feeder moves; and,
 h. said tine assemblies being spaced apart an integer of a distance somewhat greater than the longitudinal distance said feeder travels as its lower end portion moves through one period of its said rising and falling motion but less than 1.5 times said distance.

17. A method of causing a uniform flow of particulate products to be discharged from the discharge of a receptacle having a moving bottom supporting and moving a mass of such a product to said discharge consisting in:
 a. simultaneously engaging and progressing portions of the particulate product of the mass toward the discharge of the receptacle at a plurality of locations along an undulating path following a general plane extending upwardly and rearwardly from the discharge of the assembly at an angle relative to horizontal less than the angle of slide of such product;
 b. sequentially simultaneously engaging and progressing additional portions of the particulate product of the mass toward the discharge of the receptacle at a plurality of locations along a separate and different undulating path out of phase with and trailing said previous path and following along the same general plane; and,
 c. repeating step (b) repeatedly thereafter.

18. The method prescribed in claim 17 and simultaneously lifting the portions of the particulate product as they are progressed in each of said steps.

19. A method of causing a uniform flow of particulate products to be discharged from the discharge of a receptacle having a moving bottom supporting and moving a mass of such a product to said discharge consisting in:
 a. simultaneously lifting and progressing portions of the particulate product of the mass toward the discharge of the receptacle at a plurality of locations along an undulating path following a general plane extending upwardly and rearwardly from the discharge of the assembly at an angle relative to horizontal less than the angle of slide of such product; and,
 b. sequentially simultaneously lifting and progressing additional portions of the particulate product of the mass toward the discharge of the receptacle at a plurality of locations along a separate and different undulating path out of phase with and trailing the previous path and following the same general plane; and,
 c. repeating step (b).

20. The method defined in claim 19 wherein the sequential simultaneous lifting and progressing of additional portions of the particulate product is initiated closely behind the crests of the previous undulating path.

21. The method defined in claim 19 wherein the path along which the simultaneous lifting and progressing of additional portions of the product specified in subparagraph (b) is performed has essentially the same amplitude and period as that set forth in subparagraph (a) and follows the same general plane.

22. The method defined in claim 19 wherein the path along which the simultaneous lifting and progressing of additional portions of the product specified in subparagraph (c) is performed has essentially the same amplitude and period and trails the same path as that set forth in subparagraph (b) and follows the same general plane.

* * * * *